Jan. 28, 1947.　　　A. B. SMITH　　　2,414,907
FISHING DEVICE
Filed Jan. 7, 1944　　　2 Sheets-Sheet 1

Inventor
ADELBERT B. SMITH

By Clarence A. O'Brien
and Harvey B. Jacobson
Attorneys

Jan. 28, 1947.   A. B. SMITH   2,414,907
FISHING DEVICE
Filed Jan. 7, 1944   2 Sheets-Sheet 2
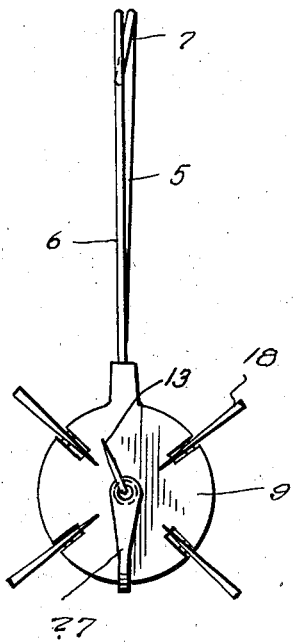
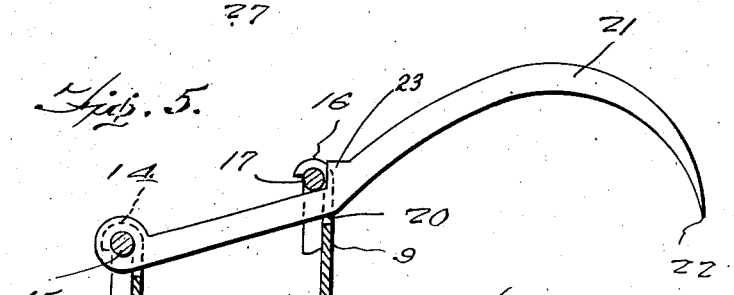
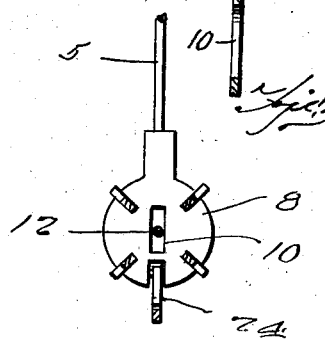
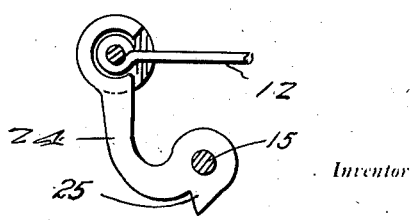
Inventor
ADELBERT B. SMITH
By Clarence A. O'Brien
and Harvey B. Jacobson
Attorneys Patented Jan. 28, 1947

2,414,907

UNITED STATES PATENT OFFICE 2,414,907

FISHING DEVICE

Adelbert B. Smith, Worcester, N. Y., assignor to Anton Paulin, Worcester, N. Y.

Application January 7, 1944, Serial No. 517,410

1 Claim. (Cl. 43—89)

The present invention relates to new and useful improvements in fish hooks and has for its primary object to provide a plurality of trigger controlled, spring actuated jaws adapted for clamping about the head of a fish when biting on the hook.

A further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a front elevational view.

Figure 5 is an enlarged side elevational view of one of the jaws with parts shown in section.

Figure 6 is a sectional view taken substantially on a line 6—6 of Figure 1.

Figure 7 is a detail of the pivotal connection for the hook.

Figure 1:
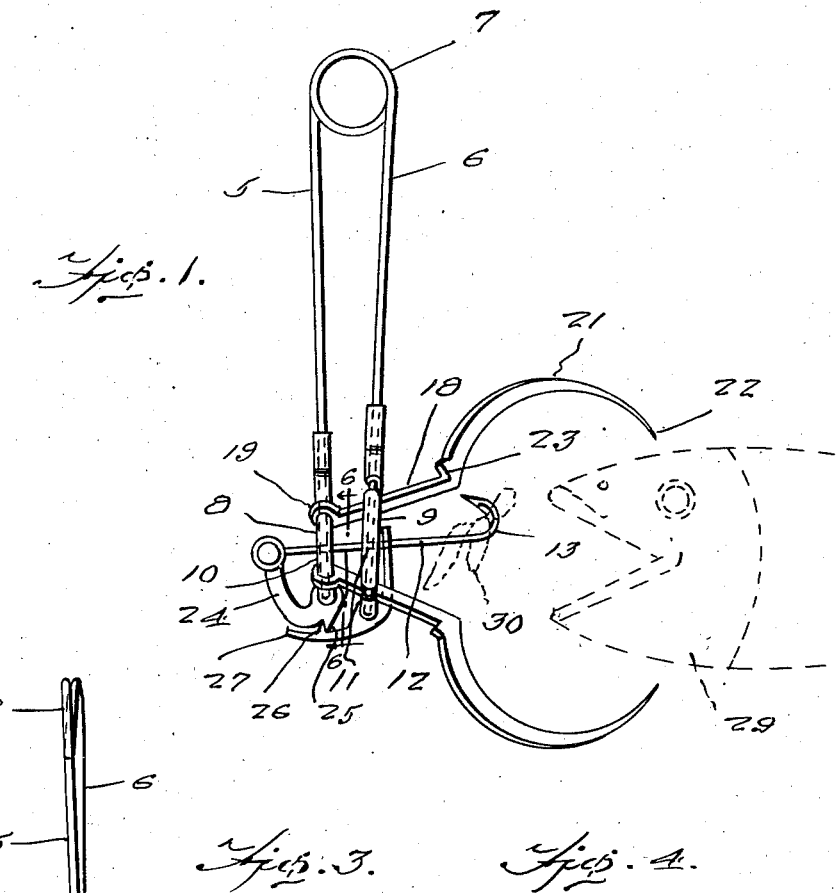
Figure 1 is a side elevational view.
Figures 3, 4:
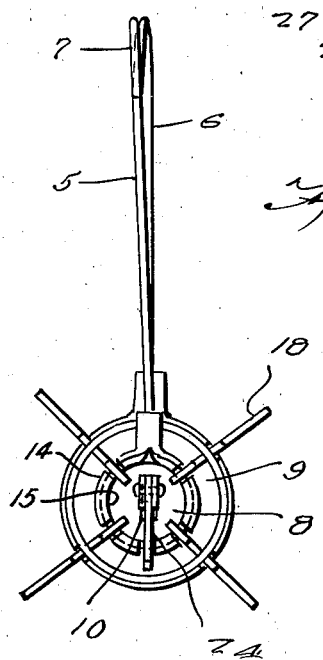
Figure 3 is a rear elevational view.
Figure 4 is a perspective view of the catch for the trigger.

Referring now to the drawings in detail, the numerals 5 and 6 designate the legs of a spring member which are connected at one end by a coil spring 7, the other ends of the legs being attached respectively to disks 8 and 9, the legs extending radially from one edge of the disks.

The disk 8 is of a diameter smaller than the disk 9 and the disks are formed with an aligned slot 10 and opening 11 through which the shank 12 of a fish hook 13 is inserted.

The disk 8 is formed with an interrupted rolled edge 14 enclosing a wire ring 15 at the periphery of the disk 8 and the disk 9 is similarly formed with a rolled edge 16 enclosing a wire ring 17 at the periphery of the disk 9.

A plurality of jaws 18 are formed at one end with eyes 19 pivotally mounted on the ring 15 and projecting through openings 20 adjacent the peripheral edge of the disk 9, the outer ends of the jaws being curved as at 21 toward each other and terminating in pointed ends 22. At the junction of the inner curved portions of the jaws are formed lateral lugs 23 functioning as stops for engaging the ring 17 of the disk 9 to limit closing movement of the jaws.

Also pivoted on the ring 15 is one end of a curved trigger 24 having its other end pivoted to the rear end of the fish hook 13. A laterally extending beveled lug 25 is formed on the trigger 24 adapted for engagement by a similar lug 26 formed adjacent one end of a curved catch 27 which is pivoted intermediate its ends on the ring 17 and extends radially inwardly therefrom and formed with an opening 28 at its other end for slidably receiving the shank 12 of the fish hook.

In the operation of the device the jaws 18 are held open as shown in Figure 1 by the engagement of the catch 27 with the trigger 24. The coil spring 7 is utilized as an eye for attaching a fish line (not shown) with the legs 5 and 6 in a suspended position and the fish hook 13 extending substantially horizontally. The jaws are held open a sufficient distance to permit the head of a fish 29 to enter the jaws to reach the bait 30 on the hook whereby a pulling action by the fish on the bait or hook will release the trigger 24 from its catch 27 and permit the spring 7 to separate the disks 8 and 9. Since the openings 20 in the disk 9 for the jaws are radially outwardly beyond the edge of the disk 8, the movement of the disks away from each other will cause the disk 9 to slide along the jaws and thus draw the curved ends of the jaws together in a manner to close the jaws about the head of the fish. The pointed ends of the jaws will accordingly penetrate into the fish head and securely hold the fish even though the fish may not be securely caught on the hook.

It is believed that the details of construction and manner of use of the device will be readily understood from the foregoing without further detailed explanation.

Having described the invention, what is claimed as new is:

A fishing device comprising a spring composed of a pair of legs and a coil connecting one end of the legs to each other, said coil constituting a fish line attaching eye for suspending the legs, a disk attached to the lower end of each leg, said disks having aligned central openings, a fish hook slidably mounted in said openings, one of said disks also having guide openings adjacent its edge, a plurality of elongated cooperating jaws having one end pivoted to the other of said disks and slidably mounted in the guide openings of the first-named disk, said guide openings being positioned radially outwardly beyond the pivot of the jaws to open and close the jaws upon movement of the disks toward and away from each other, said disks being under the influence of the spring to close the jaws, and trigger means connecting the rear end of the hook to the disks to secure the disks against jaw closing movement.

ADELBERT B. SMITH.